United States Patent
Scherenberger et al.

(10) Patent No.: US 8,768,608 B2
(45) Date of Patent: Jul. 1, 2014

(54) METHOD, DEVICE AND COMPUTER PROGRAM PRODUCT FOR MONITORING LOADING AND UNLOADING PROCEDURES IN THE CARGO HOLDS OF AN AIRCRAFT

(75) Inventors: Sven Scherenberger, Bremen (DE); Klaus Schmötzer, Stuhr (DE)

(73) Assignee: Airbus Deutschland GmbH, Hamburg (DE)

( * ) Notice: Subject to any disclaimer, the term of this patent is extended or adjusted under 35 U.S.C. 154(b) by 951 days.

(21) Appl. No.: 12/008,150

(22) Filed: Jan. 9, 2008

(65) Prior Publication Data
US 2008/0167760 A1 Jul. 10, 2008

(30) Foreign Application Priority Data
Jan. 10, 2007 (DE) .......................... 10 2007 001 529

(51) Int. Cl.
*G06F 19/00* (2011.01)
*H04B 7/185* (2006.01)

(52) U.S. Cl.
USPC .............. 701/124; 701/3; 348/143; 700/217; 700/225; 244/137.1; 382/321

(58) Field of Classification Search
USPC .................. 244/118.1, 137.1, 137; 340/531, 340/539.13, 539.15, 679, 680; 198/782, 198/788; 701/124, 3; 348/143; 700/213, 700/214, 217, 225; 382/321
See application file for complete search history.

(56) References Cited

U.S. PATENT DOCUMENTS

| | | | |
|---|---|---|---|
| 6,275,769 B1* | 8/2001 | Willis | 701/124 |
| 6,867,702 B2* | 3/2005 | Huber et al. | 340/679 |
| 7,193,512 B1* | 3/2007 | Coulthard | 340/531 |
| 7,198,227 B2* | 4/2007 | Olin et al. | 244/118.1 |
| 2002/0004695 A1* | 1/2002 | Glenn et al. | 701/35 |
| 2002/0081110 A1* | 6/2002 | Johnson et al. | 396/12 |
| 2003/0058112 A1* | 3/2003 | Gleine | 340/573.1 |
| 2007/0130599 A1* | 6/2007 | Monroe | 725/105 |
| 2009/0121085 A1* | 5/2009 | Hettwer | 244/137.1 |
| 2010/0213313 A1* | 8/2010 | Reed et al. | 244/118.1 |

FOREIGN PATENT DOCUMENTS

| DE | 10338704 A1 | 3/2005 |
|---|---|---|
| DE | 10 2005 026 898 | 1/2006 |

* cited by examiner

*Primary Examiner* — Ronnie Manch
(74) *Attorney, Agent, or Firm* — Collard & Roe, P.C.

(57) ABSTRACT

A method for monitoring loading and unloading procedures in the cargo holds of an aircraft, in which method the actual states that are present in each cargo hold are acquired. Furthermore, the invention relates to a device as well as to a computer program product for implementing the method according to the invention.

16 Claims, 2 Drawing Sheets

METHOD, DEVICE AND COMPUTER PROGRAM PRODUCT FOR MONITORING LOADING AND UNLOADING PROCEDURES IN THE CARGO HOLDS OF AN AIRCRAFT

CROSS REFERENCE TO RELATED APPLICATIONS

Applicant claims priority under 35 U.S.C. §119 of German Application No. 10 2007 001 529.3 filed Jan. 10, 2007.

BACKGROUND OF THE INVENTION

The invention relates to a method for monitoring loading and unloading procedures in the cargo holds of an aircraft, in which method the actual states that are present in each cargo hold are acquired. Furthermore, the invention relates to a device as well as to a computer program product for implementing the method according to the invention.

For transporting containers or pallets, the cargo holds comprise guides and drive rollers that have been embedded in their loading areas. The drive rollers are arranged in the direction of the guides at a distance from each other, which distance is shorter than the length of the containers or pallets to be transported. In this arrangement it is known, with corresponding monitoring personnel, to manually monitor the loading and unloading procedures by means of predetermined load plans. Such monitoring is time-consuming and error-prone because the monitoring personnel continuously have to change position between the cargo holds that are separated from each other by bulkheads and decks.

SUMMARY OF THE INVENTION

It is thus the object of the invention to disclose a method, a device and a computer program product of the type described in the introduction, by means of which monitoring of the loading and unloading procedures in the cargo holds of an aircraft is simplified considerably.

The method according to the invention is characterised in that the actual states are electronically acquired in the form of state data, and in that by means of the state data at least one graphic that simulates all the cargo holds is controlled. In this way all the procedures taking place in the cargo holds can be monitored at the same time from a central location, even if the cargo holds are visually separate from each other, for example if they are located on different decks. Controlling the graphic takes place by means of placing together in rows still pictures that are constantly updated, wherein the intervals between the individual acquisitions of the actual states are preferably selected to be sufficiently short so that, by means of the graphic, motion sequences that flow when perceived by the human eye can be simulated. Simulation advantageously takes place by way of a diagrammatic two-dimensional colour graphic. However, in principle it is also imaginable to simulate the movement sequences in 3-D graphics.

According to a first improvement of the method according to the invention, the state data is compared to predefined data in a program controlled manner, from the comparison difference data is determined, and the difference data is shown in the graphic showing the cargo holds. In order to steer the attention of the monitoring personnel to the difference data, it is particularly favourable to emphasise said data in the graphic by means of warning colours, blinking frequencies and/or acoustic warning signals.

According to the next improvement of the invention, the total mass of the containers and/or pallets located in each cargo hold are electronically acquired in the form of state data. Acquiring the total mass is necessary in order to prevent the maximum useful load weight from being exceeded, and in order to achieve optimum weight distribution.

Particularly reliable monitoring of the weight distribution that is to be observed according to the load plan is achieved in that the gravity position of the aircraft, which gravity position results from the distribution of the containers and/or pallets, is electronically acquired in the form of state data.

Further reliable monitoring of the weight distribution to be observed according to the load plan is achieved in that the contact pressure, which results from the distribution of the containers and/or pallets, acting on the nose wheel unit of the aircraft is electronically acquired in the form of state data. In this way any nose-heavy or tail-heavy weight distribution in the aircraft is advantageously prevented.

According to the next improvement of the invention, the containers and/or pallets located in each cargo hold are also electronically identified in the form of state data. Identification takes place, for example, by reading in or scanning the codes affixed to the containers and/or pallets, which codes describe the goods contained in the containers or held on the pallets, or which codes contain classifications, storage notes or transport notes relating to the goods.

In order to prevent collisions of the containers and/or pallets among each other and with the fuselage, the dimensions of the containers and pallets located in each cargo hold are also electronically acquired in the form of state data. Preferably, the containers and pallets that are used comprise standard dimensions.

Flight safety makes it mandatory for all the containers and pallets to be securely locked to the loading areas of the cargo holds prior to takeoff. The locking states of the containers and pallets located in each cargo hold are preferably also electronically acquired in the form of state data.

In order to monitor the movement sequences to be carried out by the containers and pallets, advantageously in each cargo hold the track sections along which the containers and pallets have moved are electronically acquired in the form of state data. If a container does not move to the position predetermined by means of predefined data, this is acquired in the form of state data. By comparing the state data with the predefined data, difference data is then determined, by means of which any instance of a container becoming stuck in the corresponding track section is advised by way of the graphic.

The device according to the invention features several transducers for electronically acquiring the actual states, at least one display device simulating the cargo holds, and a calculator that connects the transducers to the display device. The transducers are electronic components that are used to acquire physical values. The display device is, for example, a monitor or display that is used to visualise the actual states electronically acquired in the cargo holds. The device according to the invention can be permanently installed in the aircraft or it can be a wireless mobile unit. Preferably, command buttons are arranged on the margin of the display area of the display device. However, it is also imaginable for the command buttons to be in a separate unit, for example a standard keyboard. Also imaginable is a touch-screen-capable display device in which the command buttons are integrated in the display surface of the display device. Preferably, the on-board computer of an aircraft can also be used as a computer. The device according to the invention is thus suitable for particularly easy monitoring of all the loading and unloading procedures, which have to be carried out according to a load plan, from a central location, for example from a terminal or a cockpit.

According to a first improvement of the device according to the invention, the computer comprises at least one interface. Said interface is, for example, provided by a data read-in device that is designed to accommodate exchangeable data carriers, for example CDs, SD cards or USB sticks. However, it is also imaginable that the interface is designed as a radio receiver. The interface makes it possible for the computer to access load plans that are stored on the exchangeable data carriers or on other data storage devices in the form of predefined data.

According to the next improvement of the invention, at least one of the transducers that in each case is allocated to a cargo hold comprises scales. In each case the scales are preferably arranged at the entrances to the cargo holds, with said scales being used to acquire the mass or the weight of each individual container and of each individual pallet.

In order to be able to detect any inclined positions or inclination of the aircraft, which inclination results from unfavourable weight distribution, at least one of the transducers comprises an inclination detector. Erroneous readings can preferably be avoided by the arrangement of several inclination detectors.

A further option of ensuring weight distribution that has to be observed according to a load plan is created in that at least one of the transducers comprises a supporting-force sensing device that is allocated to the nose wheel unit of the aircraft. By means of this supporting-force sensing device any nose-heavy or tail-heavy weight distribution in the aircraft can reliably be prevented.

According to a particularly advantageous improvement of the invention, at least one transducer that in each case is allocated to a cargo hold comprises a container- and pallet identification system. Known identification systems include, for example, barcode systems, radio frequency identification (RFID) systems, or video recognition systems.

Furthermore, at least one transducer that in each case is allocated to a cargo hold comprises a detector that detects the containers and pallets. The detector is used to acquire the container- and pallet dimensions as well as to define individual transport track sections and transport track positions. Preferably it is provided for each active drive roller hinged in the storage area of the cargo hold to comprise at least one detector. Such a unit comprising a drive roller and a detector is referred to as a power drive unit (PDU). The detectors are preferably optical sensors that operate in the infrared range. In each case the space between detectors is shorter than the length of the smallest containers approved for use in the device according to the invention, or of the smallest pallets approved for use in the device according to the invention. The detectors can thus equally be used for the electronic acquisition of the container- and pallet dimensions, for the electronic acquisition of the track sections along which containers and pallets have been moved, as well as for the electronic acquisition of the container- and pallet positions at any given time.

Furthermore, for each locking device allocated to a container positioning space or pallet positioning space, in each case at least one transducer is provided as a detector that detects a locking element. This detector also preferably operates in the infrared range and is used to acquire the locking states of the containers and pallets located in each cargo hold. Some other design of the transducers, for example as an electrical switch, is of course also within the scope of the invention.

Independent protection is claimed for an aircraft that comprises the device according to the invention. The aircraft preferably comprises cargo holds arranged on various decks.

The computer program product according to the invention is characterised by at least one data processing program, at least one graphic program simulating the cargo holds, and a control program that links the data processing program to the graphic program. In this arrangement the data processing program is used to evaluate, or to convert to usable data, the electrical impulses supplied by the transducers, and to convey said impulses/data to the control program. The control program comprises invariable control sequences and variable control sequences whose variables are taken from load plans by way of suitable interfaces. Advantageously the graphic program comprises an overall graphic for the real-time display of all the cargo holds of the aircraft, as well as comprising individual graphics for the separate display of individual decks, in particular however of each individual cargo hold. Preferably, all the graphics can be presented as diagrammatic top views that show locked containers and pallets, non-locked containers and pallets, and containers and pallets associated with some malfunction in different colours and that simulate movement sequences of the containers and pallets.

BRIEF DESCRIPTION OF THE DRAWING

The invention will be described with reference to the following drawings, which show an embodiment of the invention.

DETAILED DESCRIPTION OF THE EMBODIMENTS

Figure 1:
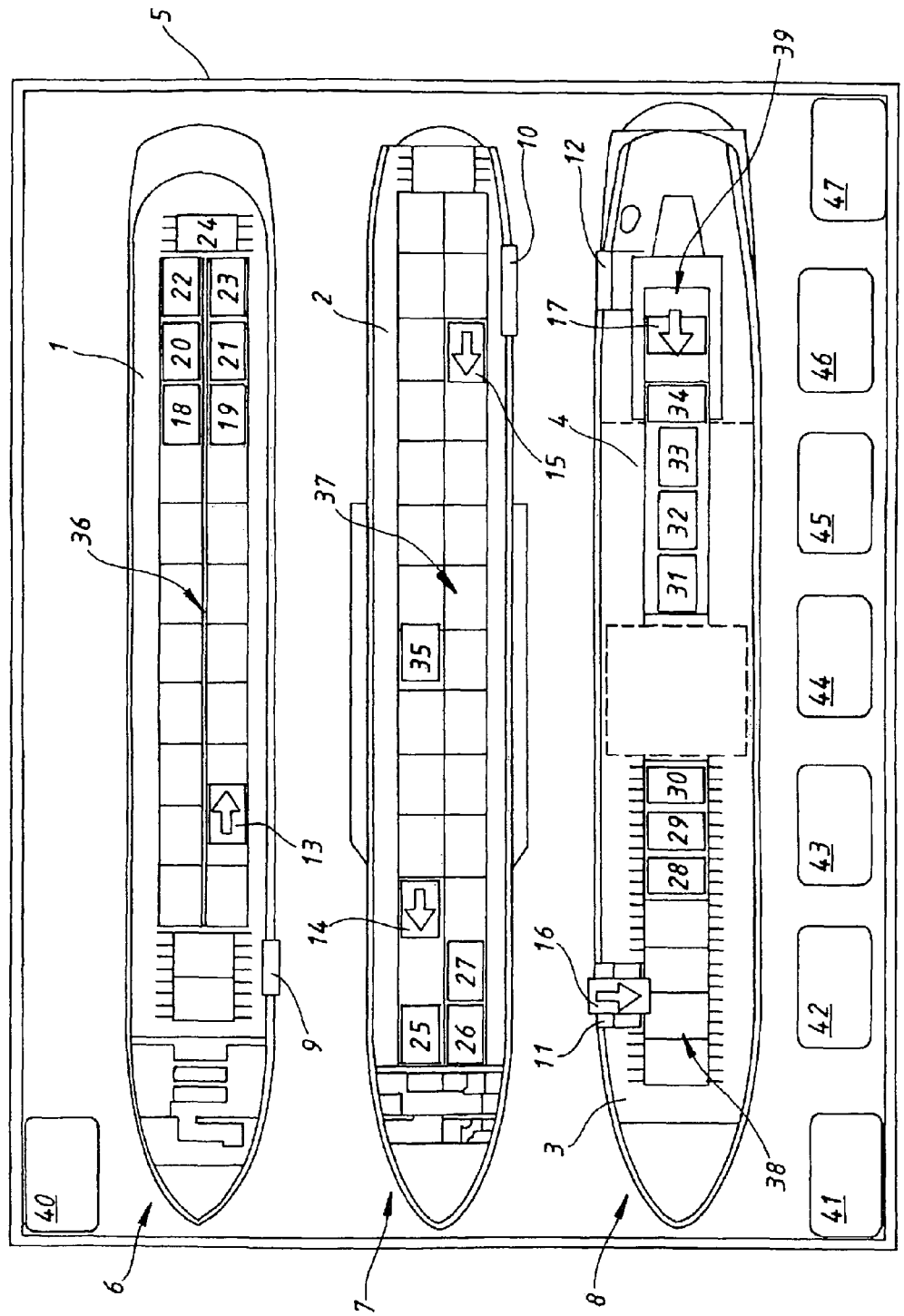
FIG. 1 shows a graphic on display device.

FIG. 1 shows a graphic on a display device 5, which graphic shows cargo holds 1, 2, 3, 4. The graphic individually shows horizontal sections of a fuselage, which horizontal sections extend through three decks 6, 7, 8, wherein the cargo hold 1 is situated in the upper deck 6, the cargo hold 2 in the main deck 7, and the cargo holds 3 and 4 in the lower deck 8. All the containers and pallets are moved into and out of the respective cargo holds 1, 2, 3, 4 by way of loading and unloading openings 9, 10, 11, 12 that do not interfere with each other. In this arrangement the containers 13, 14, 15, 16, 17 that are undergoing a transport movement at the time are shown in white and comprise an arrow that marks their direction of movement. All the containers 18 to 34 that at the given time are locked down in the cargo holds 1, 2, 3, 4 are shown in green, while a container 35 that is located in the main deck 7 and that is associated with a malfunction is shown in red. All positioning places 36, 37, 38, 39 that are still free are shown by uncoloured rectangles. The display device 5 is designed as a touch screen with command buttons 40, 41, 42, 43, 44, 45, 46, 47 that are arranged on the margin of the display area. Command button 40 is used to call up detailed information; command button 41 is used to switch the display device 5 off; command button 42 is used for the real-time display of all the decks 6, 7, 8 as shown in this exemplary embodiment; command button 43 is used to show only the upper deck 6; command button 44 is used to show only the main deck 7; command button 45 is used to show only the lower deck 8; command button 46 is used to call up a configuration menu; and command button 47 is used to change to a cabin information data system.

Figure 2:
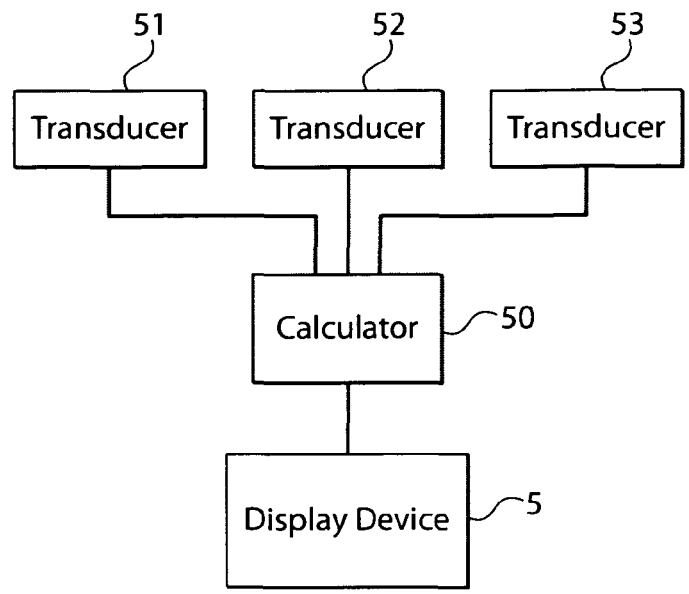
FIG. 2 shows block diagram of the device according to the invention.

FIG. 2 shows a block diagram of the monitoring device according to the invention. The monitoring device comprises several transducers 51, 52, 53, which acquire the state data, at least one display device 5 simulating the cargo holds, and a calculator 50 that connects the transducers to the display device. Transducer 51 is a scale that measures the mass or weight of each individual container and pallet. Transducer 52 is an inclination detector that detects inclined positions or the inclination of the aircraft. Transducer 53 is a supporting-force sensing device that is allocated to the nose wheel unit of the aircraft. This sensing device allows the crew to prevent any nose-heavy or tail-heavy weight distribution in the aircraft.

Figure 3:
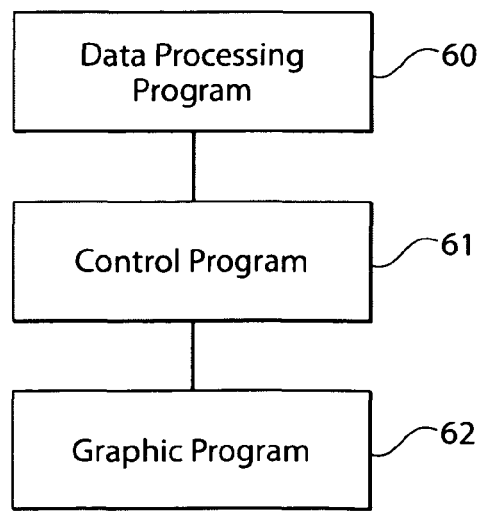
FIG. 3 shows a block diagram of the computer program product according to the invention.

FIG. 3 shows a block diagram of the computer program product according to the invention. The computer program product comprises at least one data processing program 60, at least one graphic program 62 simulating the cargo holds and a control program 61 that links the data processing program to the graphic program.

The invention claimed is:

1. A method for displaying data regarding cargo in cargo holds of an aircraft, in which method actual states present in each cargo hold are acquired, the method comprising:
   electronically acquiring the actual states in the form of state data, and
   controlling at least one graphic that simulates all the cargo holds using the acquired state data,
   wherein the state data includes locking states of containers and pallets to loading areas located in each cargo hold,
   wherein the locking states are detected by a transducer in the form of a switch assigned to each container positioning space or pallet positioning space, and
   wherein said at least one graphic is presented as a diagram that shows a top view of locked containers and pallets, and unlocked containers and pallets, in different colors.

2. The method of claim 1, wherein the state data includes the mass of the containers and/or pallets located in each cargo hold.

3. The method of claim 1, wherein the state data includes the inclined position of the aircraft, which inclined position results from the distribution of the containers and/or pallets.

4. The method of claim 1, wherein the state data includes contact pressure present at the nose wheel unit of the aircraft.

5. The method of claim 1, wherein state data is electronically read from the containers and pallets that are located in each cargo hold.

6. The method of claim 1, wherein the state data includes dimensions of the containers and pallets that are located in each cargo hold.

7. The method of claim 1, wherein the state data includes track sections along which the containers and pallets have moved in each cargo hold.

8. A device for monitoring the loading and unloading procedures in the cargo holds of an aircraft, by means of which device actual states of containers or pallets that are present in each cargo hold are acquired in the form of state data, comprising:
   several transducers for electronically acquiring the actual states,
   at least one display device simulating the cargo holds as at least one graphic, and
   a computer that connects the transducers to the display device,
   wherein the state data includes locking states of containers and pallets to loading areas located in each cargo hold,
   wherein the locking states are detected by a transducer in the form of a switch assigned to a positioning space of each container positioning space or pallet, and wherein said at least one graphic is presented as diagram that shows a top view of locked containers and pallets, and unlocked containers and pallets, in different colors, and wherein for each positioning space, at least one of said transducers is provided as a detector that detects a locking element.

9. The device of claim 8, wherein the computer comprises at least one data read-in device.

10. The device of claim 8, wherein at least one of the transducers that in each case is allocated to a cargo hold comprises scales.

11. The device of claim 8, wherein at least one of the transducers comprises an inclination detector.

12. The device of claim 8, wherein at least one of the transducers comprises a supporting-force sensing device that is allocated to the nose wheel unit of the aircraft.

13. The device of claim 8, wherein at least one transducer that in each case is allocated to a cargo hold comprises a container- and pallet identification system.

14. The device of claim 8, wherein at least one transducer that in each case is allocated to a cargo hold comprises a detector that detects the containers and/or pallets.

15. An aircraft comprising several cargo holds and comprising a device of claim 8.

16. A computer program product stored in a computer readable medium for monitoring the loading and unloading procedures in the cargo holds of an aircraft, comprising at least one data processing program, at least one graphic program simulating the cargo holds, and a control program that links the data processing program to the graphic program,
   wherein the graphic program comprises graphics which are presented as diagrams of the cargo holds, the diagrams showing top views of locked containers and pallets, and unlocked containers and pallets in different colors, and wherein the computer program product is configured to obtain data regarding locked and unlocked containers and pallets from transducers in the form of switches assigned to each container positioning space or pallet positioning space in the cargo hold.

* * * * *